(12) United States Patent
Partsch

(10) Patent No.: US 8,079,268 B2
(45) Date of Patent: Dec. 20, 2011

(54) CERAMIC PRESSURE SENSORS AND METHOD FOR PRODUCING THE SAME

(75) Inventor: Uwe Partsch, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 169 days.

(21) Appl. No.: 12/296,604

(22) PCT Filed: Apr. 5, 2007

(86) PCT No.: PCT/EP2007/053415
§ 371 (c)(1),
(2), (4) Date: Jul. 31, 2009

(87) PCT Pub. No.: WO2007/116030
PCT Pub. Date: Oct. 18, 2007

(65) Prior Publication Data
US 2010/0005894 A1    Jan. 14, 2010

(30) Foreign Application Priority Data
Apr. 10, 2006    (DE) .......................... 10 2006 018 049

(51) Int. Cl.
*G01L 7/00* (2006.01)

(52) U.S. Cl. ...................................................... 73/706

(58) Field of Classification Search .................. None
See application file for complete search history.

(56) References Cited

U.S. PATENT DOCUMENTS

| | | | |
|---|---|---|---|
| 5,954,900 A | 9/1999 | Hegner et al. | |
| 6,387,318 B1 | 5/2002 | Xue et al. | |
| 2004/0200287 A1 | 10/2004 | Mueller et al. | |
| 2004/0200291 A1 * | 10/2004 | Dai et al. | ........................ 73/766 |

FOREIGN PATENT DOCUMENTS

DE    103 08 0820 A1    9/2004

OTHER PUBLICATIONS

English, J.M. et al., "Wireless micromachined ceramic pressure sensors," 12th IEEE Int'l Conf., Orlando, FL, US, Jan. 17-21, 1999, pp. 511-516; XP010321771; ISBN: 0-7803-5194-0.

(Continued)

*Primary Examiner* — Andre Allen
(74) *Attorney, Agent, or Firm* — Greenblum & Bernstein, P.L.C.

(57) ABSTRACT

The invention relates to the field of multilayer ceramics and relates to ceramic pressure sensors, such as can be used, for example, for industrial process control. The object of the invention is to disclose ceramic pressure sensors that are mounted in a largely mechanically stress-free manner and have a long service life, and the production of which is more effective and more cost-effective. The object is attained with ceramic pressure sensors, comprising a support of tapes, wherein the tape(s) embody at least one cavity that is covered with at least one ceramic pressure membrane tape or in which a ceramic pressure membrane tape covering the cavity is located, and wherein the tape(s) have at least one supply line for the pressure connection to the cavity, and the tape composite is sintered. The object is further attained with a method for production, in which at least one tape is structured for producing a cavity, at least one pressure membrane tape is positioned on the cavity for covering, and subsequently the tape composite is sintered.

18 Claims, 1 Drawing Sheet

OTHER PUBLICATIONS

Figure 1:
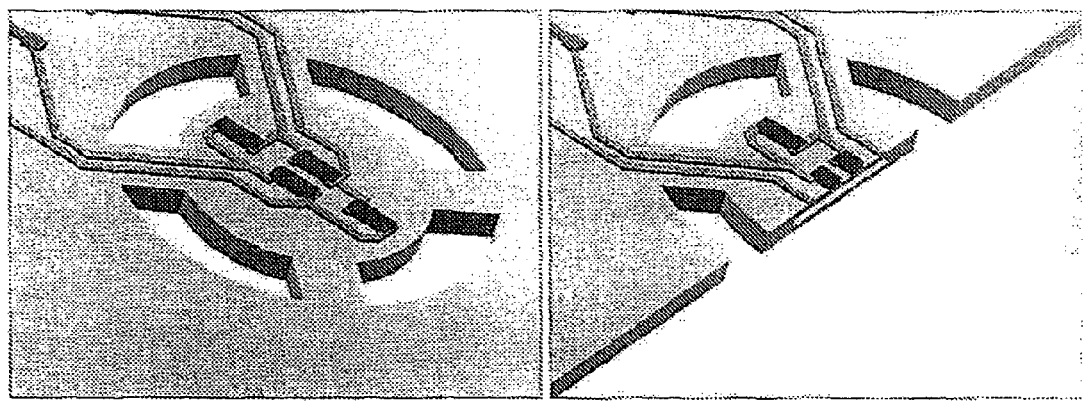

Böttgenbach, S., "Mikromechanik," Studienbücher: Angewandte Physik, B.G. Teubner, Stuttgart 1991.
Pfiefer, G. et al., "Drucksensoren," Verlag Technik, Berlin, 1989.
Schaumburg, H., "Sensoren," Teubner-Verlag, Stuttgart 1992.
Tränkler, H.-R. et al., (ed.): "Sensortechnik," Springer-Verlag, Berlin 1998.
Pietriková, A., "Potentiality of LTCC for Sensor Applications," ISSE 2001, 24th Int'l Spring Seminar on Electronics Technology, May 5-9, 2001, Calimanesti-Caciulata, Romania.
Perraud, Eric, "Berechnung piezoresistiver Silizium-Drucksensoren," Sensortechnik, Sonderheft Design & Elektronik-Sensortechnik, Oct. 1997, pp. 20-24.

* cited by examiner

CERAMIC PRESSURE SENSORS AND METHOD FOR PRODUCING THE SAME

The invention relates to the fields of multilayer ceramics and sensor technology and relates to ceramic pressure sensors, such as can be used, for example, for industrial process control in pneumatic or hydraulic installations, in test engineering, heating and air-conditioning technology or environmental technology, and a method for the production thereof.

The currently most frequently used variant of the detection of the physical value of pressure is membrane-based, wherein the pressure-induced deflection of a membrane is converted into an electric signal via various measuring principles (Büttgenbach, S., Mikromechanik, Studienbücher: Angewandte Physik, B. G. Teubner, Stuttgart 1991; Pfeifer, G. et al., Drucksensoren, Verlag Technik, Berlin, 1989; Schaumburg, H., Sensoren, Teubner-Verlag, Stuttgart 1992; Tränkler, H.-R. et al., (ed.): Sensortechnik, Springer-Verlag, Berlin 1998).

The membrane is surrounded by thicker material areas for mechanical stabilization.

Known membrane materials are, e.g., silicon, stainless steel and ceramic (Perraud, E., Sensortechnik, Sonderheft Design & Elektronik-Sensortechnik, October 1997; Pfeifer, G., et al., Drucksensoren, Verlag Technik, Berlin, 1989; Schaumburg, H., Sensoren, Teubner-Verlag, Stuttgart 1992; Tränkler, H.-R. et al., (ed.), Sensortechnik, Springer-Verlag, Berlin 1998.

The technologies for producing the membranes are designed very differently according to the specified materials. Stainless steel membranes and ceramic membranes are preferably mechanically processed in the last production steps, which is associated with high costs. The high requirements with respect to membrane flatness and membrane thickness can be met only through complex surface processing such as polishing and lapping. The sensor bodies are thereby handled individually or in corresponding magazines (Pfeifer, G., et al., Drucksensoren, Verlag Technik, Berlin, 1989).

Silicon-based membranes can be produced in multiple set-ups (etching). This provides a great advantage with respect to the productivity of the method, which leads to a more favorable price. Furthermore, these membranes have the advantage of a high surface quality after the etching, which renders superfluous a subsequent cost-intensive surface processing (Perraud, E., Sensortechnik, Sonderheft Design & Elektronik-Sensortechnik, October 1997).

A known weak point of the known pressure membrane bodies is the joint between membrane body and sensor housing and/or pressure connection (Pfeifer, G., et al., Drucksensoren, Verlag Technik, Berlin, 1989).

According to the conditions of use, housings of pressure sensors comprise, for example, stainless steel or cast aluminum or a plastic injection molded part.

Accordingly, very different materials have to be connected to one another at the joints, such as, for example, ceramic/stainless steel or silicon/pyrex/stainless steel (Pyrex—borosilicate glass with silicon-adjusted thermal expansion behavior) (Perraud, E., Sensortechnik, Sonderheft Design & Electronik-Sensortechnik, October 1997).

Adhesion, anodic bonding, overglazing, soldering, brazing or welding are used as technologies for forming the joints.

A review of the materials and their thermal coefficient of expansion makes it clear that mechanical stresses must occur during temperature changes, which mechanical stresses affect the sensor signal at least in part. These mechanical stresses also counteract the required long-term stability of the sensors.

In order to solve these problems, the geometry areas that surround the membranes are designed to be particularly solid in order to guarantee a mechanical rigidity. For example, the stabilizing body surrounding a membrane that is 100 μm thick can easily be 1-2 cm thick.

A further disadvantage of the known solutions for pressure sensors lies in that the evaluation circuit cannot be integrated onto the membrane bodies (Büttgenbach, S., Mikromechanik, Studienbücher: Angewandte Physik, B. G. Teubner, Stuttgart 1991; Pfeifer, G. et al., Drucksensoren, Verlag Technik, Berlin, 1989; Schaumburg, H., Sensoren, Teubner-Verlag, Stuttgart 1992; Tränkler, H.-R. et al., (ed): Sensortechnik, Springer-Verlag, Berlin 1998).

The object of the invention is to disclose ceramic pressure sensors that are mounted in a largely mechanically stress-free manner and have a long service life, high thermal stability and thermal shock resistance, and the production of which is more effective and more cost-effective.

The object is attained through the invention disclosed in the claims. Advantageous embodiments are the subject matter of the subordinate claims.

The ceramic pressure sensors according to the invention comprise a support, which is formed from one or more tapes, wherein the tape or tapes embodies or embody at least one cavity, which is covered with at least one ceramic pressure membrane tape or in which a ceramic pressure membrane tape covering the cavity is located, and wherein the tape(s) have at least one supply line for pressure connection to the cavity, and the tape composite is sintered.

Advantageously the tapes are ceramic tapes (HTCC=High Temperature Cofired Ceramics), vitroceramics or ceramic/glass composites (LTCC=Low Temperature Cofired Ceramics).

Furthermore advantageously, the cavity in cross section has a round, oval, square, triangular, rectangular or polygonal shape.

Likewise advantageously, the pressure membrane tape comprises ceramic (HTCC=High Temperature Cofired Ceramics), vitroceramics or ceramic/glass composites (LTCC=Low Temperature Cofired Ceramics).

It is also advantageous if the pressure connection is realized via two channel-type supply lines.

It is furthermore advantageous if one or more cavities are arranged on the support next to one another and/or one on top of the other.

It is also advantageous if a cavity is located above and below a pressure membrane tape.

It is likewise advantageous if the cavity is materially only partially connected to the surrounding support material, even more advantageously, if the cavity is materially connected to the surrounding support material with one to four webs.

It is furthermore advantageous if the evaluation circuit is positioned on the sensor body.

With the method according to the invention for producing ceramic pressure sensors, at least one tape is structured for producing a cavity, at least one pressure membrane tape is positioned on the cavity for covering, and subsequently the tape composite is sintered.

Advantageously, to produce a cavity, an organic sacrificial paste is pressed and covered with at least one pressure membrane tape and compressed or laminated, and subsequently the tape composite is sintered.

It is also advantageous if the tapes are produced with ceramic tape technologies.

It is also advantageous if the ceramic pressure sensors are produced with the ceramic multilayer technology.

Likewise advantageously, already sintered tapes are also used.

With the solution according to the invention, ceramic pressure sensors can be produced in a simple, effective and cost-effective manner that are mounted in a largely mechanically stress-free manner and thus are substantially improved, compared to solutions from the prior art, with respect to long-term stability and non-interference of the measuring signal.

Through the use of the ceramic multilayer technology known from ceramics, pressure sensors can be produced from various vitroceramic and ceramic materials. The prerequisite thereby is that the material can be processed to form a tape.

The pressure sensors according to the invention can thereby be arranged both on the level in large numbers as well as in the vertical direction, wherein the pressure sensor with its cavity and the pressure connection can also be integrated into other assemblies on or in the support tape once or multiple times.

Interior conductor paths and through-hole plating for the electrical connection of the evaluation circuit can also be integrated through the use of several tapes.

The structuring of the tapes for embodying the cavity and the micro channels can be carried out by means of micro-punches, lasers, micro milling cutters or etching.

The ceramic tapes and pressure membrane tapes are produced by means of tape casting methods and are commercially available in various compositions and thicknesses from 50 to 250 µm.

A particular advantage of the solution according to the invention lies in the miniaturization of ceramic pressure sensors, which is limited only by the tape thickness and the structuring. However, larger pressure sensors can also be produced, which correspond in size to the known pressure sensors.

The production method according to the invention also makes it possible to fill the cavities with any desired gases or to evacuate the cavities. The cavity can also be closed on both sides by a pressure membrane.

It is also possible for a cavity to be covered with a pressure membrane tape and one or more tapes to be arranged above it, wherein another cavity is located above the pressure membrane tape lying opposite the lower cavity.

Ceramic pressure sensors according to the invention can be used as differential pressure sensors, absolute pressure transducers as well as for realizing redundant systems.

The pressure sensors according to the invention show improved properties compared to pressure sensors according to the prior art or at least equally good properties, wherein in these cases the production is much easier and more cost-effective.

The invention is described below in more detail based on an exemplary embodiment.

It shows:

FIG. 1 A diagrammatic representation of a ceramic pressure sensor according to the invention in complete view and in section. The dimensions visible in the FIGURE do not correspond to the actual dimensions.

EXAMPLE 1

A piezoresistive pressure sensor is produced by the combination of an LTCC sensor base structure of 5 tapes (1250 µm thick) and an LTCC membrane of one tape (250 µm thick). The tapes of the sensor base structure are first compressed, i.e., laminated. After the lamination, the pressure chamber itself as well as the two micro channels necessary for the pressure connection (depth pressure chamber and micro channels 400 µm) are milled out of the sensor base structure by means of laser ablation. The micro channels lead from the pressure chamber to the pressure connection via a length of respectively 8 mm. At the same time four openings for mechanical release of the pressure chamber are cut out. The cutting-out of four identical openings is likewise carried out on the membrane tape.

After this structuring, the membrane tape is positioned above the laminated sensor base structure such that the openings for the mechanical release are arranged one on top of the other. Subsequently the tapes are pressed to one another. In this manner the closed pressure chamber necessary for pressure detection is formed.

During the subsequent heat treatment at 875° C., base structure and membrane are sintered with a volume contraction of 35% and a monolithic vitroceramic body is produced. The membrane diameter after the heat treatment is 4.5 mm.

The thick tape resistors and conductor paths necessary for measuring the pressure are now deposited by means of silk screening and subsequently sintered at 850° C. Of the 4 resistors located on the membrane, two are arranged in the edge area and two in the center area and switched to form a Wheatstone bridge.

During pressure application, a warping of the membrane occurs through the pressure connection of the pressure chamber via the micro channels. The membrane warping causes a change in resistance that is proportional to the pressure applied and is measured as a change in bridge tension.

Compared to pressure sensors of silicon/pyrex/stainless steel according to the prior art, the pressure sensors according to the invention show a considerably increased service life.

The invention claimed is:

1. Ceramic pressure sensors comprising a support, which is formed from one or more tapes, wherein the tape(s) embodies or embody at least one cavity that is covered with at least one ceramic pressure membrane tape or in which a ceramic pressure membrane tape covering the cavity is located, wherein the tape(s) have at least one supply line for the pressure connection to the cavity, and the tape composite is sintered, and wherein a plurality of cavities are arranged on the support next to one another and/or one on top of the other to thereby mechanically decouple the sensors from the tape composite.

2. Ceramic pressure sensors according to claim 1, in which the tapes are ceramic tapes.

3. Ceramic pressure sensors according to claim 1, in which the cavity in cross section has a round, oval, square, triangular, rectangular or polygonal shape.

4. Ceramic pressure sensors according to claim 1, in which the pressure membrane tape comprises ceramic (HTCC=High Temperature Cofired Ceramics), vitroceramics or ceramic/glass composites (LTCC=Low Temperature Cofired Ceramics).

5. Ceramic pressure sensors according to claim 1, in which the pressure connection is realized via two channel-type supply lines.

6. Ceramic pressure sensors according to claim 1, in which one or more cavities are arranged on the support next to one another and/or one on top of the other.

7. Ceramic pressure sensors according to claim 1, in which a cavity is located above and below a pressure membrane tape.

8. Ceramic pressure sensors according to claim 1, in which the cavity is materially only partially connected to the surrounding support material.

9. Ceramic pressure sensors according to claim 8, in which the cavity is materially connected to the surrounding support material with one to three webs.

10. Ceramic pressure sensors according to claim 1, in which the evaluation circuit is positioned on the sensor body.

11. Method for producing ceramic pressure sensors according to claim 1, in which at least one tape is structured for producing a cavity, at least one pressure membrane tape is positioned on the cavity for covering, and subsequently the tape composite is sintered.

12. Method according to claim 11, in which to produce a cavity, an organic sacrificial paste is pressed and covered with at least one pressure membrane tape and compressed or laminated, and subsequently the tape composite is sintered.

13. Method according to claim 11, in which the tapes are produced with ceramic tape technologies.

14. Method according to claim 11, in which the ceramic pressure sensors are produced with the ceramic multilayer technology.

15. Method according to claim 11, in which already sintered tapes are also used.

16. Ceramic pressure sensor having a closed pressure chamber for pressure detection, said ceramic pressure sensor comprising:

a sensor base structure comprised of a plurality of laminated tapes;

a pressure chamber and a plurality of micro channels for pressure connection created in said sensor base structure by having been milled therefrom, the micro channels leading from the pressure chamber to the pressure connection;

a plurality of openings in the sensor base structure for mechanical decoupling of the pressure chamber;

a membrane tape positioned on said laminated sensor base structure, thereby forming a tape composite.

17. Ceramic pressure sensor according to claim 16, wherein:

the tape composite is sintered.

18. Ceramic pressure sensor according to claim 16, wherein:

said plurality of openings provides a plurality of strips for providing said mechanical decoupling of the pressure chamber.

\* \* \* \* \*